Aug. 7, 1928.
J. W. POSTEL
1,679,782
AUTOMOBILE BUMPER
Filed Feb. 4, 1927
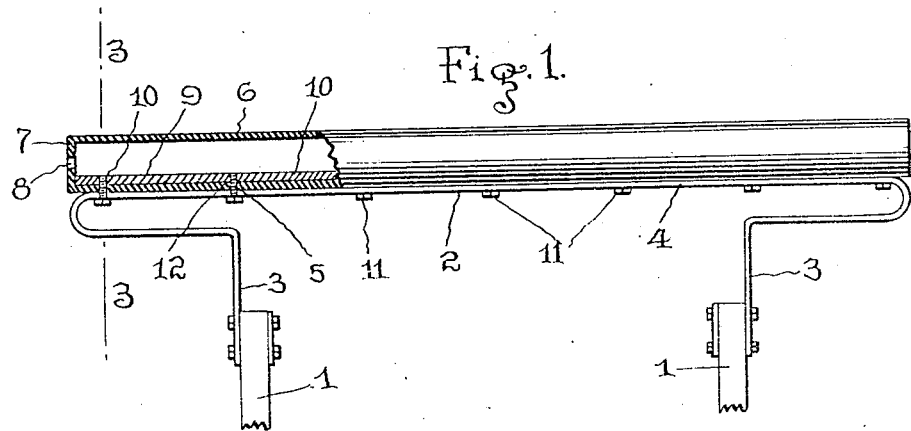
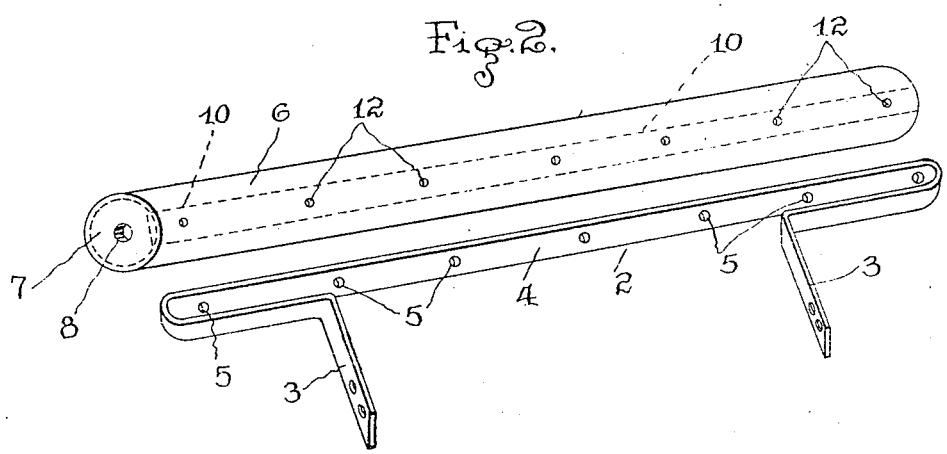
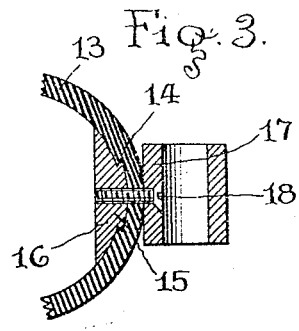
INVENTOR
JOHN WILLIAM POSTEL
BY
*Clarence S. Ashley*
ATTORNEY Patented Aug. 7, 1928.

1,679,782

UNITED STATES PATENT OFFICE.

JOHN WILLIAM POSTEL, OF PALISADE, NEW JERSEY.

AUTOMOBILE BUMPER.

Application filed February 4, 1927. Serial No. 165,809.

The invention relates to improvements in motor vehicle bumpers and has particular reference to a structure comprised of suitable supporting and attaching means having associated therewith a cushioning semi-pneumatic buffer means arranged to absorb shock and thereby protect the adjacent parts of apparatus to which it is attached.

The object of the invention resides in the providing of a supporting and attaching frame having mounted thereon or secured thereto a flexible and resilient buffer tube having formed therein during the process of fabricating said tubular members, means for attaching same to said frame, said cushioning or buffer member being provided with apertures, leaving its interior open to atmospheric pressure in order to provide a semi-pneumatic bumper means for the purposes as described.

In the following I describe the general embodiment of the invention, the features thereof being more specifically set forth hereinafter in the claim.

In the drawings Fig. 1 is a plan of the structure, part thereof being shown in longitudinal section to more clearly show the invention; Fig. 2 is a perspective view of the invention showing the relative parts of the invention disassembled to illustrate its general form of attaching same to a vehicle; and Fig. 3 is a cross sectional view on the line 3—3 of Fig. 1 showing a means of securing a supporting or strengthening member within the bumper tube to reinforce same and of means for preventing the movement of the relative parts constituting the invention.

Similar numerals of reference indicate similar parts throughout the several views.

In the drawings 1 designates the shackle ends of the spring suspension of a motor vehicle, and 2 the supporting and attaching frame formed with attaching arms 3 and a buffer piece 4 provided with a plurality of apertures 5.

6 indicates a buffer cushioning tube of a specially formed and fabricated rubber body provided with enclosed ends 7 and having in one end thereof an aperture 8 adapted to permit atmospheric pressure to enter said tube 6 to provide the semi-pneumatic effect.

Referring to Fig. 3 of the drawings the tube or pneumatic buffer 13 has formed therein a dove-tail channel 14 into which a rib or key 15 or reinforcing attaching plate 16 engages rendering said tube 13 and plate 16 substantially a unit part of the structure, said unit structure being secured to bumper plate 17 by means of suitable attaching screws 18.

It is obvious that the structure may be varied in divers way without departing from the spirit of the invention.

What is claimed and desired to secure by Letters Patent of the United States is:—

A device of the character described comprising a bumper supporting bracket provided with laterally extending arms for attaching same to a vehicle chassis, a cushioning tube, a longitudinally extending reinforcing strip disposed within said cushioning tube, and a plurality of attaching bolts mounted in said bracket and engaging said tube and reinforcing strip for fastening said tube in detachable relation to said aforesaid bracket, said reinforcing strip being provided with a rib adapted to be embedded in said tube to prevent the movement of the respective engaging members thereof.

In testimony whereof, I have signed my name to this specification, this 20th day of January, 1927.

JOHN WILLIAM POSTEL.